(12) United States Patent
Neto et al.

(10) Patent No.: US 10,599,404 B1
(45) Date of Patent: Mar. 24, 2020

(54) M/A FOR COMPILING PARALLEL PROGRAM HAVING BARRIER SYNCHRONIZATION FOR PROGRAMMABLE HARDWARE

(75) Inventors: David Neto, Toronto (CA); Deshanand Singh, Mississauga (CA); Tomasz Czajkowski, Toronto (CA); John Stuart Freeman, Toronto (CA); Tian Yi David Han, Toronto (CA)

(73) Assignee: Altera Corporation, San Jose, CA (US)

( * ) Notice: Subject to any disclaimer, the term of this patent is extended or adjusted under 35 U.S.C. 154(b) by 1243 days.

(21) Appl. No.: 13/486,151

(22) Filed: Jun. 1, 2012

(51) Int. Cl.
*G06F 9/45* (2006.01)
*G06F 8/41* (2018.01)
*G06F 8/40* (2018.01)

(52) U.S. Cl.
CPC .............. *G06F 8/41* (2013.01); *G06F 8/40* (2013.01); *G06F 8/443* (2013.01); *G06F 8/458* (2013.01); *G05B 2219/13134* (2013.01); *G06F 8/433* (2013.01)

(58) Field of Classification Search
CPC .......... G06F 8/314; G06F 8/433; G06F 8/456; G06F 8/445–458; G06F 8/41; G06F 8/458; G05B 2219/13134
USPC ........................................ 717/119, 149–150
See application file for complete search history.

(56) References Cited

U.S. PATENT DOCUMENTS

| | | | | |
|---|---|---|---|---|
| 6,912,706 B1* | 6/2005 | Stamm | ................ | G06F 15/7867 716/117 |
| 8,387,005 B1* | 2/2013 | Ghosh-Roy | ............... | G06F 8/34 717/109 |
| 8,392,900 B1* | 3/2013 | Collard | .................... | G06F 8/458 717/159 |
| 2003/0033514 A1* | 2/2003 | Appleby-Allis | .... | G06F 15/7867 713/100 |
| 2006/0059574 A1* | 3/2006 | Fayad | .............. | H03K 19/17768 726/34 |
| 2009/0240890 A1* | 9/2009 | Collard | .................... | G06F 9/52 711/125 |
| 2009/0307699 A1* | 12/2009 | Munshi | ................. | G06F 9/4843 718/102 |
| 2009/0322769 A1* | 12/2009 | Zhou | ........................ | G06F 8/31 345/522 |

(Continued)

OTHER PUBLICATIONS

Muhsen Owaida, Nikolaos Bellas, Konstantis Daloukas and Christos D. Antonopoulos. "Synthesis of Platform Architectures from OpenCL Programs". In Proc. of FCCM., May 1-3, 2011.*

(Continued)

*Primary Examiner* — Lewis A Bullock, Jr.
*Assistant Examiner* — Tina Huynh

(57) ABSTRACT

A method of compiling program code includes determining if the program code controls a programmable logic device to execute other program code. The program code is a parallel program having a barrier function call for a group of threads. If it is determined that program code is to control the programmable logic device, then the program code is transformed by replacing the barrier function call with control logic inserted into the program code such that the transformed program code remains a parallel program and maintains synchronization among the group of threads. A compiler system that compiles program code with a barrier function call for a group of threads is also described.

27 Claims, 12 Drawing Sheets

(56) References Cited

U.S. PATENT DOCUMENTS

| | | | | |
|---|---|---|---|---|
| 2011/0067001 A1* | 3/2011 | Heintel | ............... | G06F 17/5045 717/106 |
| 2011/0161944 A1* | 6/2011 | Cho et al. | ...................... | 717/149 |
| 2013/0125097 A1* | 5/2013 | Ebcioglu | ............. | G06F 17/5045 717/136 |

OTHER PUBLICATIONS

Muhsen Owaida, Nikolaos Bellas, Christos D. Antonopoulos, Konstantis Daloukas, and Charalambos Antoniadis. "Massively Parallel Programming Models Used as Hardware Description Language: The OpenCL Case". Proceedings of the International Conference on Computer-Aided Design. IEEE Press, 2011.*

Konstanis Daloukas, Christos D. Antonopoulos, and Nikolaos Bellas. "GLOpenCL: OpenCL Support on Hardware- and Software-Managed Cache Multicores". Proceedings of the 6th International Conference on High Performance and Embedded Architectures and Compilers. Jan. 24-26, 2011. Heraklion, Greece.*

Jaejin Lee, Jungwon Kim, Sangmin Seo, Seungkyun Kim, Jungho Park, Honggyu Kim, Thanh Tuan Dao, Yongjin Cho, Sung Jong Seo, et al. "An OpenCL Framework for Heterogeneous Multicores with Local Memory", Proceedings of the 19th International Conference on Parallel Architectures and Compilation Techniques. Sep. 11-15, 2010. Vienna, Austria.*

Pekka O. Jaaskelainen, Carlos S. de La Lama, Pablo Huerta and Jarmo H. Takala. "OpenCL-Based Design Methodology for Application-Specific Processors". Embedded Computer Systems (SAMOS), 2010 International Conference. pp. 223-230. Jul. 19-22, 2010.*

Tseng, Compiler Optimizations for Eliminating Barrier Synchronization, Jul. 19-21, 1995, 12 pages.*

* cited by examiner

TRANSFORMATION FOR SINGLE-THREADED TARGETS

TRANSFORMATION FOR CONCURRENT TARGETS

M/A FOR COMPILING PARALLEL PROGRAM HAVING BARRIER SYNCHRONIZATION FOR PROGRAMMABLE HARDWARE

FIELD

Embodiments of the present invention relate to software and programmable hardware. More specifically, embodiments of the present invention relate to method and apparatus for compiling parallel program having barrier synchronization for programmable hardware.

BACKGROUND

Processors or microprocessors have embraced parallelism to increase their performance. For example, Central Processing Units (CPUs) have added multiple cores. Graphics Processing Units (GPUs) have also evolved from fixed function rendering component into parallel processors. As these parallel platforms are made available, it is necessary to enable software developers to take full advantage of these parallel processing platforms.

Open Computing Language (OpenCL) is an open standard programming framework for writing parallel programs that can be executed across these parallel processing platforms. It uses task-based and data-based parallelism to provide parallel computing. OpenCL is managed by Khronos Group, a non-profit technology consortium.

OpenCL separates execution program code (i.e., kernel code) from management program code (i.e., host code). Host code refers to standard C language code that can be executed on any OpenCL supported parallel processing platform. Kernel code is a C-based programming language code specifying functions with restrictions and extensions that allow for the specification of parallelism and memory hierarchy.

Barrier synchronization is a required feature of the OpenCL programming model. It typically refers to a type of synchronization mechanism that halts or stops execution of any thread within a group that reaches the barrier point until all other threads of the group reach the same barrier point. Thread (or thread of execution) is the smallest execution unit that can be scheduled by an operating system. Barrier synchronization is typically provided by a built-in workgroup barrier function that can be used by a kernel executing on a target platform to perform synchronization between threads in a group executing the kernel. Therefore, all the threads of the group must execute the barrier construct before any of the threads is allowed to continue execution beyond the barrier.

General CPUs and GPUs carry out barrier synchronization with their fixed register set (or processor register). Using the fixed register set to store bounded context data in known locations, the processor (e.g., CPU or GPU) can perform a context switch between threads (i.e., halting and swapping threads for execution) during their execution to achieve barrier synchronization. Bounded context data refer to data representing a thread's context that must be saved to known locations and later restored.

However, processors configured from field programmable gate array (FPGA) devices do not have such inherent architecture to support barrier synchronization because FPGAs only include transistor gates that can be programmed into state machines, data paths, arbitration logics, and buffers. There is no fixed register set. Instead, there are just live values distributed throughout the hardware, and state machines that control activities in the distributed data paths.

SUMMARY

Thus, what is needed is a mechanism that allows OpenCL program code to run on programmable hardware that does not support barrier synchronization.

According to an embodiment of the present invention, a method of compiling program code determines if the program code controls a programmable logic device to execute other program code. The program code is a parallel program having a barrier function call for a group of threads. If it is determined that the program code is to control a programmable logic device, then the program code is transformed by replacing the barrier function call with control logic inserted into the program code such that the transformed program code remains a parallel program and maintains synchronization among the group of threads. The determining and transforming may be performed using a processor.

BRIEF DESCRIPTION OF THE DRAWINGS

The features and advantages of embodiments of the present invention are illustrated by way of example and are not intended to limit the scope of the embodiments of the present invention to the particular embodiments shown.

DETAILED DESCRIPTION

In the following description, for purposes of explanation, specific nomenclature is set forth to provide a thorough understanding of embodiments of the present invention. It will be apparent to one skilled in the art that specific details in the description may not be required to practice the embodiments of the present invention. In other instances, well-known circuits, devices, procedures, and programs are shown in block diagram form to avoid obscuring embodiments of the present invention unnecessarily.

Figure 1:
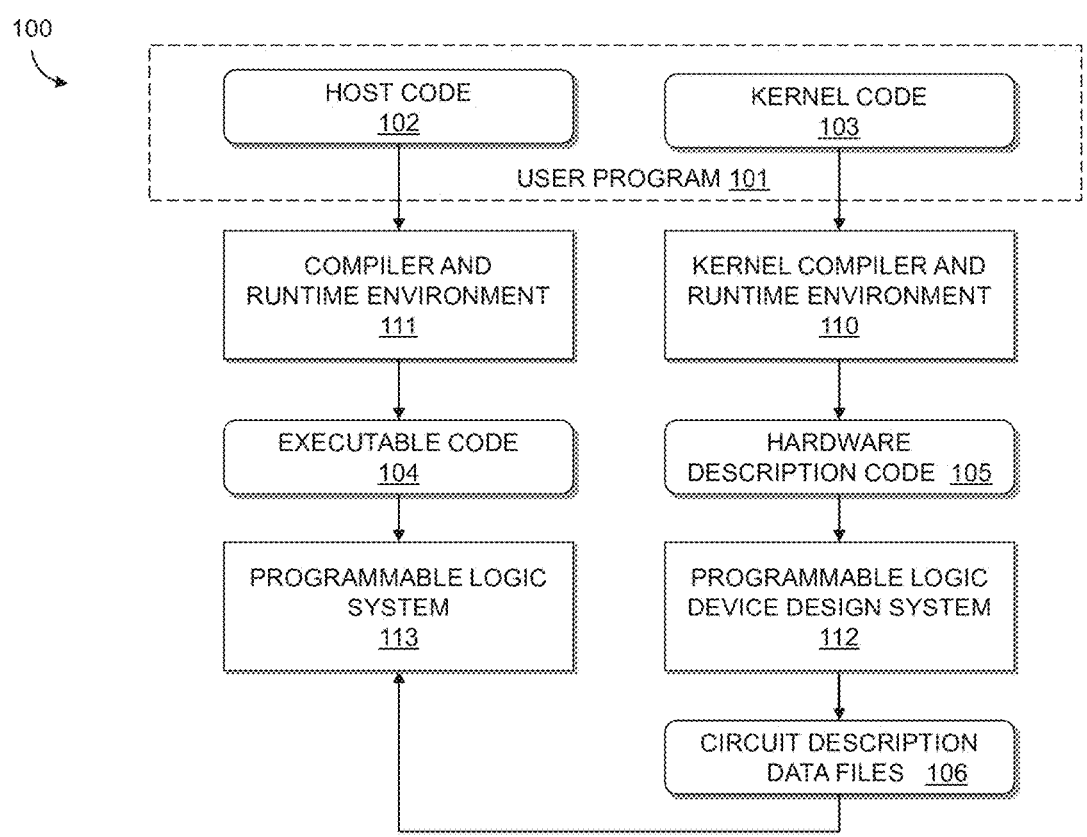
FIG. 1 is a block diagram illustrating a software program compilation and execution system that includes an OpenCL compiler and runtime environment that includes a barrier synchronization logic generator that implements one embodiment of the present invention.

FIG. 1 is a block diagram that illustrates a software program compilation and execution system 100 according to an embodiment of the present invention. The software program compilation and execution system 100 includes a plurality of modules that may be implemented as software programs executed by a processor. The modules are represented as rectangular blocks in FIG. 1. The software program compilation and execution system 100 also includes a plurality code and files that may be processed by and generated by one or more of the modules. The code and files are represented as rounded blocks in FIG. 1.

User program 101 is a software program written by a program or software developer. The user program 101 includes host code 102 and kernel code 103. According to an embodiment of the present invention, the kernel code 103 may be OpenCL kernel code. OpenCL is a programming framework for writing parallel programs that can be executed across heterogeneous parallel processing platforms such as CPUs and GPUs. It should be appreciated that in alternate embodiments, the kernel code 103 may be program code written in accordance with other parallel computing and programming frameworks and/or standards.

According to an embodiment of the present invention, the host code 102 is a standard C language code to be compiled and executed by the software program compilation and execution system 100. The host code may be code written to be executed by a programmable logic system. According to this embodiment, kernel code 103 is a C-based programming language code that specifies functions with restrictions and extensions that allow for the specification of parallelism and memory hierarchy. It may support parallel (or concurrent) computing using task-based and data-based parallelism. The host code 102 may also include APIs (Application Programming Interfaces) used to define and control application-specific processors or accelerators. The kernel code 103 is separate from the host code 102 and may be used to program or configure a programmable logic system into the application-specific processors or accelerators (i.e., processor plus memory). It should be appreciated that the kernel code 103 may also be used to program a programmable logic system into other computing and/or control systems.

The software program compilation and execution system 100 includes a kernel compiler and runtime environment 110 that compiles kernel program code 103 and transforms the kernel program code into hardware description code 105. The kernel compiler and runtime environment 110 is a programmable logic system-specific compiler and runtime environment. According to an embodiment of the present invention, the kernel code 103 may include a call to a barrier synchronization primitive or function for a group of threads.

The kernel compiler and runtime environment 110 transforms the kernel program code 103 into a transformed program code without the barrier synchronization function call. The kernel compiler and runtime environment 110 replaces the barrier function call with control logic inserted into the program code such that the transformed program code remains a parallel program without the barrier function call and yet still maintaining synchronization among the group of threads.

The hardware description code 105 provides hardware description language (HDL) design definitions to describe the logic to be programmed into a programmable logic system. The HDL language can be Verilog, VHDL (i.e., very-high-speed integrated circuit (VHSIC) hardware description language (VHDL)), or other descriptive language, according to one embodiment of the present invention. The HDL design definitions provided by the hardware description code 105 provide a higher level of abstraction than transistor level or logic gate level. They provide description or specification that describes components and interconnections in the programmable system. The hardware description code 105 declares registers which correspond to variables in the kernel code 103. The hardware description code 105 also describes the combination logic by using constructs that are familiar from RTL-level programming languages such as if-then-else and arithmetic operations. RTL focuses on describing the flow of signals between registers.

The software program compilation and execution system 100 includes a programmable logic device design system 112. The programmable logic device design system 112 transforms the hardware description code 105 into circuit description data files 106. The programmable logic device design system 112 may be an electronic design automation computer aided design tool that performs synthesis. According to an embodiment of the present invention, synthesis involves generating an optimized logical representation (e.g., logic gates and logic elements) of the system to be programmed on the programmable logic system from the HDL design definitions specified in the hardware description code 105. Synthesis also includes mapping the optimized logic design. Mapping includes determining how to implement logic gates and logic elements in the optimized logic representation with specific resources on the programmable logic system.

The programmable logic device design system 112 produces a placement for each of the functional or logical blocks of the optimized logic design. This includes determining which resources on the programmable logic system are to be used for specific logic elements. The programmable logic device design system 112 routes the system by determining how to connect the functional blocks in the system. The programmable logic device design system 112 also performs an assembly procedure to create the circuit description data files 106.

According to an embodiment of the present invention, the circuit description data files 106 specify how a programmable logic system is programmed into performing certain logic functions to support executing code originating from the host code 102. The circuit description data files 106 may be a binary bit stream that is used to program the programmable logic system. Alternatively, the circuit description data files 106 may be used to program a set of layout masks used to manufacture integrated circuit device that implements the programmable logic system.

The software program compilation and execution system 100 includes a programmable logic system 113. According to an embodiment of the present invention, the programmable logic system 113 is a field programmable gate array (FPGA) device. In another embodiment, the programmable logic system 113 is a structured application specific integrated circuit (ASIC) system. In yet other embodiments, the programmable logic system 113 may be implemented using other types of programmable target devices. The programmable logic system 113 may be a system that includes a host processor (e.g., CPU and/or GPU) and an FPGA with on-board memory. In this embodiment, the FPGA can be programmed into a multiple accelerator structure. Each accelerator includes a programmed dedicate processor and its associated memory. In another embodiment, programmable logic system 113 can be an FPGA device with embedded CPU and/or GPU and accelerators.

The software program compilation and execution system 100 includes a compiler and runtime environment 111. The compiler and runtime environment 111 compiles the host code 102 into executable code 104. The executable code 104 is in a format that may be run by the programmable logic system 113.

Figure 2:
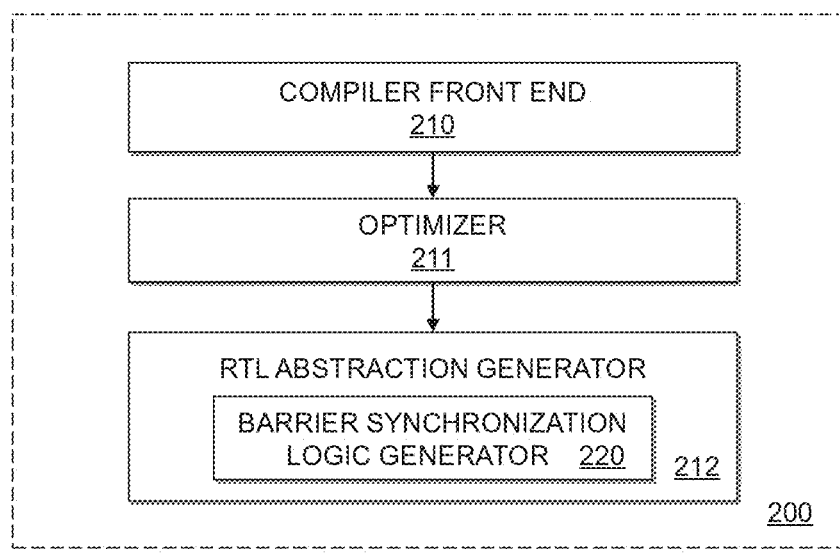
FIG. 2 is a block diagram illustrating an OpenCL compiler and runtime environment according to a first embodiment of the present invention.
Figure 3:
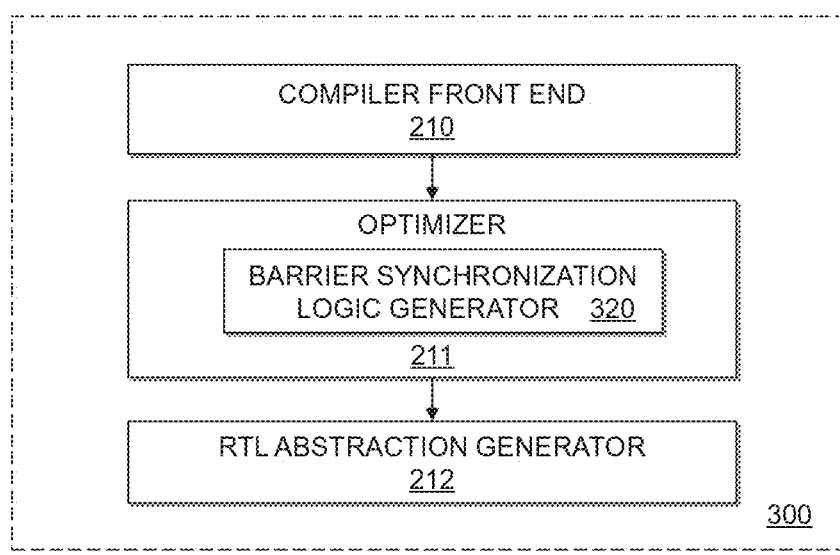
FIG. 3 is a block diagram illustrating an OpenCL compiler and runtime environment according to a second embodiment of the present invention.

FIG. 2 is a block diagram illustrating an embodiment of the kernel compiler and runtime environment 200 according to an embodiment of the present invention. The kernel compiler and runtime environment 200 may be implemented as the kernel compiler and runtime environment 110 illustrated in FIG. 1. The kernel compiler and run time environment 200 includes a compiler front end 210, an optimizer 211, a register-transfer level (RTL) abstraction generator 212, and a barrier synchronization logic generator 220. As illustrated in FIG. 2, the barrier synchronization logic generator 220 is implemented inside RTL abstraction generator 212. FIG. 3 illustrates an alternate embodiment of the kernel compiler and runtime environment 300 where a barrier synchronization logic generator 320 is implemented inside the optimizer 211. It should be appreciated that in other embodiments, the barrier synchronization logic generator may be implemented outside both the optimizer 211 and RTL abstraction generator 212.

Returning to both FIGS. 2 and 3, the barrier synchronization logic generator 220/320 inserts control logic by first checking whether a target execution environment in the programmable logic system 113 (illustrated in FIG. 1), specified by user input or by the kernel code 103, is single-threaded (i.e., sequential execution). If the target execution unit is a single-threaded target, then the barrier synchronization logic generator 220/320 modifies control flows and adds data structures (counters and First-In-First-Out storage) into the code. If the target execution environment is concurrent (i.e., parallel), then the barrier synchronization logic generator 220/320 performs the transformation by replacing the barrier calls with extra hardware (counters and FIFO storage or buffer), and modifying the control signals that enable and/or control the affected hardware blocks in the transformed program. The barrier synchronization logic generator 220/320 and the associated processes of replacing barrier synchronization function calls with control logic allow for computing platforms configured or programmed on the programmable logic system 113 and with a level of abstraction lower than CPU or GPU (i.e., no fixed register set and automatic context switching between threads) to support multi-core parallel thread execution and yet still maintain synchronization between the threads during execution. In other words, the barrier synchronization logic generator 220/320 detects and maps the barrier functions into the programmable hardware implemented by the programmable logic system 113 in a program dependent way (i.e., dependent on the user program 101).

The compiler front end 210 receives kernel code 103 and translates the kernel code 103 to a compiler intermediate representation of the kernel code 103. The compiler intermediate representation of the kernel code 103 includes a sequence of functions and named data storage. Each function is a sequence of instructions grouped into basic blocks. A basic block is a contiguous sequence of instructions with one entry point and one exit point. An instruction in the middle of a basic block may be a function call, but may not count as an exit point from the basic block. Each basic block terminates with either (1) branch (possibly conditional), or (2) a return from the function. The barrier synchronization primitive is expressed as a function call to the special barrier function. The kernel code 103 also includes the system description of the eventual hardware target system implemented or programmed on the programmable logic system. The output of the compiler front end 210 is an un-optimized LLVM (Low Level Virtual Machine) IR. The entire translation operation performed by the compiler front end 210 is a standard code compilation process and the compiler front end 210 may complete the operation using known procedures. In one embodiment, the compiler front end 210 is a CLANG (C Language family front end for Low Level Virtual Machine) front end.

The optimizer 211 transforms and optimizes the compiler intermediate representation by mapping it to hardware constructs. The optimizer 211 may use Static Single Assignment (SSA) to further restrict the intermediate representation. In SSA, computed values are given a name, and the instruction that computes the value is referred to as the value's definition site. A value is computed so that it can be used by instructions that execute later in the program code, and each of those later instructions is known as a use of the value. In one embodiment, the system description of the eventual hardware target system implemented or programmed on the programmable logic system 113 is supplied to the optimizer 211.

The RTL abstraction generator 212 translates the optimized compiler intermediate representation from the optimizer 211 to hardware description code. In the embodiment of the kernel compiler and runtime environment 200 illustrated in FIG. 2, the optimized compiler intermediate representation from the optimizer 211 still includes barrier functions for barrier synchronization. In the kernel compiler and runtime environment 300 illustrated in FIG. 3, the optimized compiler intermediate representation from the optimizer 211 does not include any barrier function because the barrier synchronization logic generator 320 has replaced the functions with control logic (e.g., encode the control flows and then add logics).

The RTL abstraction generator 212 provides a level of abstraction (i.e., at register transfer level) of describing the operation of the target system to be programmed on the programmable logic system. An RTL description or abstraction provides high level representations of a circuit in terms of the flow of signals (or transfer of data) between hardware registers, and the logic operations performed on those signals.

Referring back to FIG. 1, the host code 102 is compiled by the compiler and runtime environment 111 and executed by the programmable logic system 113. The kernel code 103 is compiled by the kernel compiler and runtime environment 110 into a hardware description code 105, which is then transformed or converted by the programmable logic device design system 112 into circuit description data files 106. The circuit description data files 106 describe logic (e.g., the application-specific processors or accelerators) that are programmed or configured into the programmable logic system 113. This allows the application-specific processors programmed on the programmable logic system 113 to be optimized for different tasks and customizable to suit the needs of a particular application running on them.

According to an embodiment of the present invention, the programming of the programmable logic system 113 with the kernel code 103 is a static process and multiple kernels could be handled by a single programmable logic device. Static may refer to the programmable logic system 113 being programmed before use or programmed when it is started (in the case of RAM-based programmable logic device), and is not changed when in operation. In another embodiment, the programming of the programmable logic system 113 with the kernel code 103 is a dynamic process where some or all of the programmable logic is configured or programmed on the fly. This allows kernels to be loaded on demand. RAM-based programmable logic devices are especially effective for this approach.

The inclusion of the OpenCL programming model and the kernel code 103 allows a designer of the programmable logic system 113 to view the programmable logic system 113 as a configurable multi-core processor when developing the host code 102. In other words, OpenCL is a multi-core programming model that is used to provide a higher-level layer of abstraction for the programmable logic system 113. OpenCL on programmable logic device or system also simplifies the methodology of getting logic into the programmable logic device because the language is high level, requiring fewer details to be explicitly described by the developer (instead of a level of abstraction such as Register-Transfer Level (RTL)). This allows software developers to take advantage of programmable logic devices (e.g., FPGAs) without having to use the existing programmable logic array design tools.

As described above, the kernel code 103 is a parallel code. The term kernel (or kernel code) means the parallel code that specifies functions that allow for the specification of parallelism and memory hierarchy. At runtime, the parallel code is invoked by a special call to the kernel, and the amount of parallelism is expressed as a set of work items corresponding to the set points in a two dimensional or three dimensional index spaces. The indices in each dimension are integers ranging from 0 through some bound specified at runtime.

A work group is the set of work items that a kernel need to execute concurrently. The index space specified in the kernel invocation is partitioned at runtime into sets of work groups, depending on algorithm requirements and device capabilities. In one embodiment of the present invention, threads are used to execute a work group, with one thread per work item. Therefore, work items in a work group are also referred to as threads. Each thread in a work group is live (live thread) for as long as it is still executing the kernel, and dead otherwise.

The term thread (or thread of execution) refers to the smallest execution unit that can be scheduled by an operating system. A process may include multiple threads that share resources such as memory. According to an embodiment of the present invention, two or more threads may share the same data stored. In particular, the threads of a process share instruction code and context of the process. Context may refer to values that variables of a process reference at any given moment. Thus, context may also be referred to as thread context.

To ensure consistency between threads within a work group and to maintain memory ordering when sharing data among the concurrently executed threads, barrier synchronization is employed. As described above, barrier synchronization is a synchronization function or primitive for parallel programs to ensure consistent execution between threads within a work group. It is expressed in the kernel code 103 as a function call to the special barrier function or primitive. It provides the guarantee that all live threads in a work group must reach the barrier before any of them may continue execution beyond the barrier.

More generally, a rendezvous point is any point in the execution in the user program 101 at which all live threads must synchronize. These occur at barrier call sites but also at the entry and exit points of the kernel code 103. The overall execution of the kernel code 103 can be seen as a progression from one rendezvous point to the next. At that time during program execution, the set of live threads is leaving one rendezvous point and working towards arriving at the next.

The state of a thread may only affect or be affected by its interaction with memory. Thus, the memory loads and stores can be separated into those that are issued before reaching the barrier (i.e., pre-barrier) and those issued after the memory barrier (post-barrier). The barrier rule may require that pre-barrier memory operations for all live threads must complete before any post-barrier memory operations are issued.

An example of parallel code that includes a barrier function call is illustrated below. In this exemplary code, the OpenCL work group size is at least as large as an array A. This is for illustration purposes only and the actual kernel code 103 may include additional and/or more complicated barrier functions.

```
_kernel void barrier2(_global int*A, int n) {
    const int gid=get_global_id(0); // This is the id of the
        thread in the parallel work space.
    // This does a parallel reduction add.
    // In the end A[0] has the sum of all elements in A.
    for (int buddy_offset=1; buddy_offset<n; buddy_off-
        set*=2) {
    if ((gid & buddy_offset) // This thread is the right-hand
        buddy in the pair.
        && (gid+buddy_offset<n) // We won't read beyond
            the end of the array.)
        ) {
    A[gid]+=A[gid+buddy_offset]; // The left-hand buddy
        accumulates the value from the right-hand buddy.
    } else {
    // This thread just waits around until the end of the work
        group.
    }
    // Wait for all parallel threads with current buddy value
        to get here.
    barrier(CLK_GLOBAL_MEM_FENCE);
    }
}
```

According to an embodiment of the present invention, when the exemplary parallel code with barrier function illustrated above is input through the compiler front end 210 (shown in FIG. 2), the LLVM compiler intermediate representation illustrated below is generated.

```
; ModuleID='b.pre-bc'
target    datalayout="e-p:64:64:6441:8:848:8:8416:16:
    16432:32:32464:64:64-f32:32:f64:64:64:64-v64:64:
    64-v128:128:128-a0:0:64-s0:64:64-f80:128:128-n8:
    16:32:64"
target triple="x86_64-unknown-linux-gnu"
define void @barrier2(i32 addrspace(1)* nocapture %A,
    i32%n) nounwind {entry:
  %call=tail call i32 @get_global_id(i32 0) nounwind
      readnone ; gid=get_global_id(0)
  %cmp21=icmp sgt i32%n, 1 ;See whether to skip the
      loop entirely. br i1 %cmp21, label %bb.nph, label
      %for.end
bb.nph: ; preds=%entry
  %idxprom14=sext i32 %call to i64%
  %arrayidx16=getelementptr inbounds i32 addrspace
      (1)* %A, i64%idxprom14
  %call19=tail call i32 @get_local_id(i32 3) nounwind
      readnone
  br label %for.body
for.body: ;preds=%if.end, %bb.nph
  ;;; Choose which value to use for buddy_offset
  ;;; the loop entry value (1), or the one computed at end
      of previous iteration
  %buddy_offset.022=phi i32 [1, %bb.nph], [%mul,
      %if.end]
  ;;; Compute the condition for the "if"
  %and =and i32%buddy_offset.022, %call
  %tobool.not=icmp ne i32%and, 0
  %add=add nsw i32%buddy_offset.022, %call
  %cmp7=icmp slt i32%add, %n
  %or.cond=and i1%tobool.not, %cmp7
  ;;; Do the "if" branch.
  br i1 %or.cond, label %if.then, label %if.end
if.then: ; preds=%for.body
  ;;; The true case for the "if". Add the right-hand buddy
      element value to the left hand buddy value.
  %idxprom=sext i32%add to i64
  %arrayidx=getelementptr inbounds i32 addrspace(1)
      *% A, i64 %idxprom
  %tmp12=load i32 addrspace(1)* %arrayidx, align 4%
  %tmp17=load i32 addrspace(1)* %arrayidx16, align
      4%
  %add18=add nsw i32%tmp17, %tmp12
  ;;; Store the sum for this buddy pair.
  store i32%add18, i32 addrspace(1)* %arrayidx16,
      align 4 br label %if.end
if.end: ; preds=%if.then, %for.body
  ;;;; BARRIER SYCHRONIZATION
  tail call void @_acl_barrier_(i32 2, i32%call19) noun-
      wind
  ;;; Set up next iteration of the loop: update buddy_off-
      set.
  % mul=shl i32%buddy_offset.022, 1
  ;;; Conditional branch based on "buddy_offset<n"
  %cmp=icmp slt i32%mul, %n
  br i1 %cmp, label %for.body, label %for.end
for.end: ; preds=%if.end, %entry
  ret void;; Exit the function
}
declare i32 @get_global_id(i32) readnone
declare void @_acl_barrier_(i32, i32)
declare i32 @get_local_id(i32) readnone
!altera.opencl.ir.version=!{!0}
!opencl.kernels=!{!1}
!0=metadata !{metadata !"0.0"}
!1=metadata !{metadata !"name", metadata !"barrier2",
    metadata !"attrs", metadata !2}
!2=metadata !{metadata !"num_vector_lanes", metadata
    !3}
!3=metadata ! {i64 1}
```

As can be seen from the example above, the IR shows how the code has been transformed into very low level. The main features include "define void @barrier2" and each basic block is an indented paragraph, and each has a label. The blocks are "entry:", "bb.nph:", "for.body", "if.then", "if.end", and "for.end". Each basic block ends with either a transfer of control to another basic block ("br" is for branch), or "ret" to return from the function.

In addition, each of the computed values is a "%<name>" variable. For example, the first instruction is "% call=tail call i32 @get_global_id(i32 0) nounwind readnone". According to an embodiment of the present invention, this means the function "get_global_id with argument 0 is called. The result is a 32-bit integer value that the IR will refer to as "% call". It is the logical thread ID in OpenCL. The body of the function is executed concurrently by many different thread IDs. This % call value is used again later in the above exemplary IR (i.e., in the "bb.nph" basic block and the "for.body" basic block). In other words, the "% call" value is alive across those blocks. Because "% call" is live in the program before and after the barrier call (because the barrier call is in the loop, can % call is used in the loop), then the % call value must be stored in a FIFO (First-In-First-Out) storage as part of the "live state" of the logical thread.

However and as described above, the target hardware environment to which the kernel code 103, when compiled, is applied does not have the CPU or GPU architecture which includes a processor register (or a fixed register set). In a CPU (or GPU or other digital processor) architecture, the processor register is a small amount of storage available as part of the CPU. Such registers are addressed by mechanisms other than main memory and can be accessed more quickly. Processor registers are at the top of the memory hierarchy, and provide the fastest way to access data. Using the processor registers to store bounded context data in known locations, CPUs and GPUs can perform a context switch between threads (i.e., halting and swapping threads for execution) during their execution to achieve barrier synchronization. Bounded context data refer to data representing a thread's context that must be saved to known locations and later restored, as described above.

However, because the kernel code 103, when compiled, is applied to the programmable logic system 113, as is shown in FIG. 1, it is thus necessary to replace the barrier functions in the code with corresponding control logics inserted into the hardware. This may be performed by the barrier synchronization logic generator 220/320. The programmable logic system 113 of FIG. 1 includes transistor gates that can be programmed into state machines, data paths, buffers, and arbitration logics. There is no fixed register set. There are only live values distributed throughout the hardware, and state machines that control activities in the distributed data paths.

The barrier synchronization logic generator 220/320 performs the transformation or translation operation such that the output code from the barrier synchronization logic generator 220/320 is semantically equivalent, but not longer has barrier function calls. The translation process by the barrier synchronization logic generator 220/320 first determines live values to save for a suspended thread. The synchronization logic generator 220/320 then determines how to suspend and revive threads with a FIFO storage or buffer, according to one embodiment. In another embodiment, multiple FIFOs are employed. In a further embodiment, non-FIFO storage for contexts is used. In this case, the thread contexts are stored in a data structure with less strict requirements than a FIFO. The requirements can be (1) partitioning the stored contexts into those at the "leaving" barrier and those at the "arriving" barrier, (2) selectively pulling an arbitrary context from the "leaving" set, (3) inserting a context into the "arriving" barrier, and (4) inserting variable-width contexts or filtering out useless parts of the data on the pull side. This is required when the kernel has multiple barrier sites, and the amount of live data differs between them.

The barrier synchronization logic generator 220/320 then determines when a logical thread arrives at the barrier, and when the execution of the thread is resumed (i.e., leaving the barrier). The barrier synchronization logic generator 220/320 also determines the trigger condition to say that all the threads have arrived and the switch from accumulating threads at the barrier to resuming threads by having them leave the barrier should take place. The synchronization logic generator 220/320 handles all of the above by deleting the barrier calls and replacing them with inserted code of control logic into the compiler IR of the kernel code 103. The translation or transformation process and operation of the generator 220/320 is described in more detail, also in conjunction with FIGS. 4-8.

Figure 4:
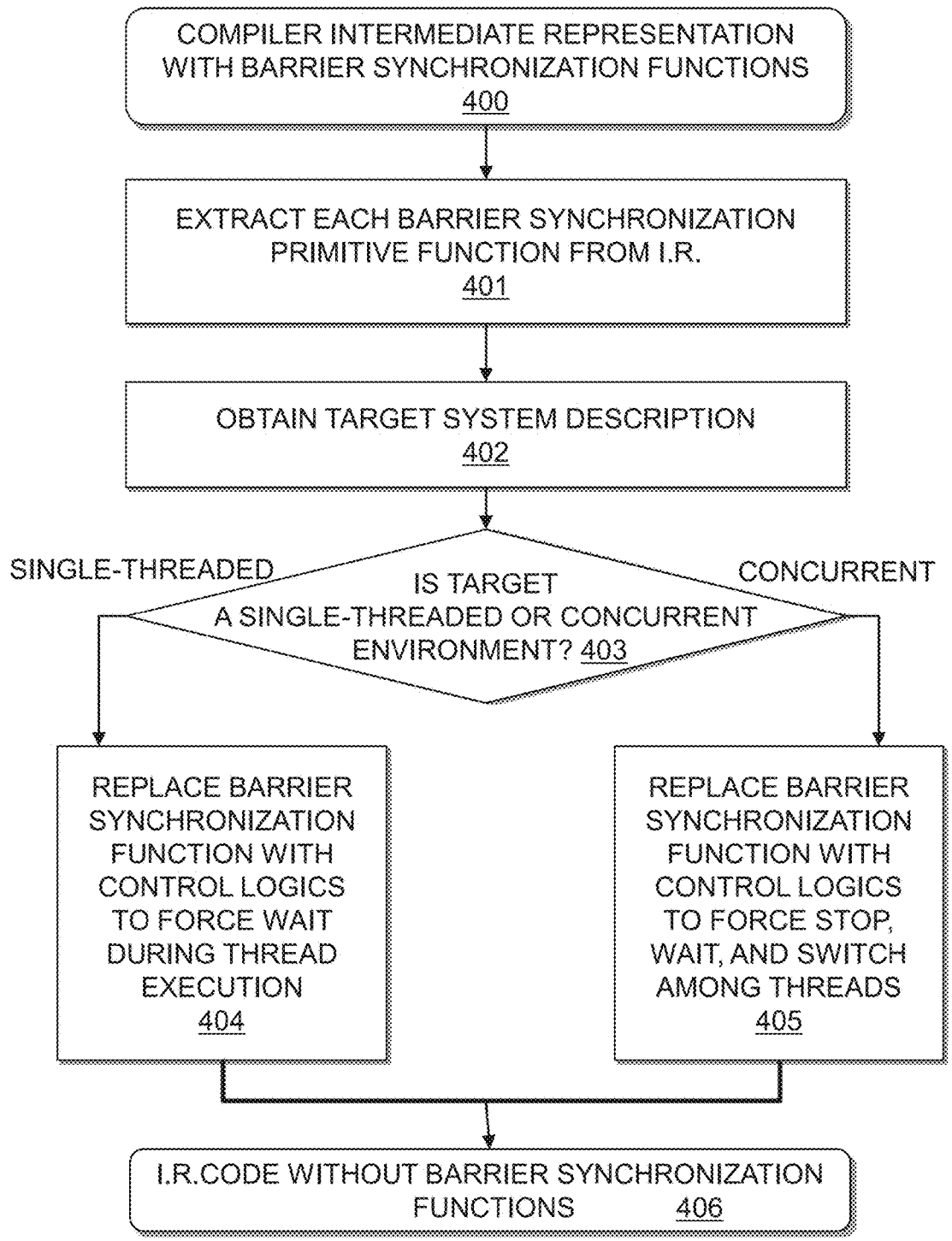
FIG. 4 is a flow chart diagram illustrating a procedure performed by a barrier synchronization logic generator according to an embodiment of the present invention.

FIG. 4 is a flow chart diagram illustrating a procedure performed by the barrier synchronization logic generator 220/320, according to an embodiment of the present invention. At 401, intermediate representation with barrier synchronization functions from the compiler 400 are received. Each of the barrier functions in the compiler intermediate representation is identified and extracted. The kernel function is to be executed in parallel, and include barrier calls. Each work item thread independently executes the instructions in the intermediate representation. Thread creation and shutdown are not explicitly expressed.

At 402, a description of the target hardware system is obtained from user input or from kernel code.

At 403, it is determined if the target hardware system is a single-threaded execution environment or concurrent execution environment. According to an embodiment of the present invention, in a single-threaded execution environment only one thread is being executed at any given time. Concurrent execution environment means that the target environment supports concurrent thread execution. If at 403, it is determined whether the target hardware system is a single threaded execution environment or a concurrent execution environment. If control determines that the target hardware system is a concurrent execution environment, control proceeds to 405. If control determines that the target system is a single threaded execution environment, control proceeds to 404.

At 404, the barrier function in the code is replaced with additional code for control logics to force wait and suspension during thread execution. In this case, the translation or conversion of the barrier function is an IR to IR transformation. Details of the process will be described in more detail below, also in conjunction with FIG. 6.

At 405, the barrier function in the code is replaced with additional code for control logics to force stop, wait, and switch between threads during thread execution. In this case, the same fundamental concepts and data structures are employed as those in the single-threaded target hardware. The realization of a concurrent program in hardware starts by expressing the program for a concurrent target as a set of concurrent objects that interact by sending signals or messages to each other. Updates can occur simultaneously to many objects at the same time. Each object has its own set of rules for updating its internal stat based on incoming signals, and for generating signals for other objects. Each object is realized in hardware as a logic block with internal state, and each signal is realized as a set of wires between blocks, each with one driver. Details of the process will be described in more detail below, also in conjunction with FIG. 8.

At 406, I.R. code without barrier synchronization functions is generated from 404/405.

Figure 5:
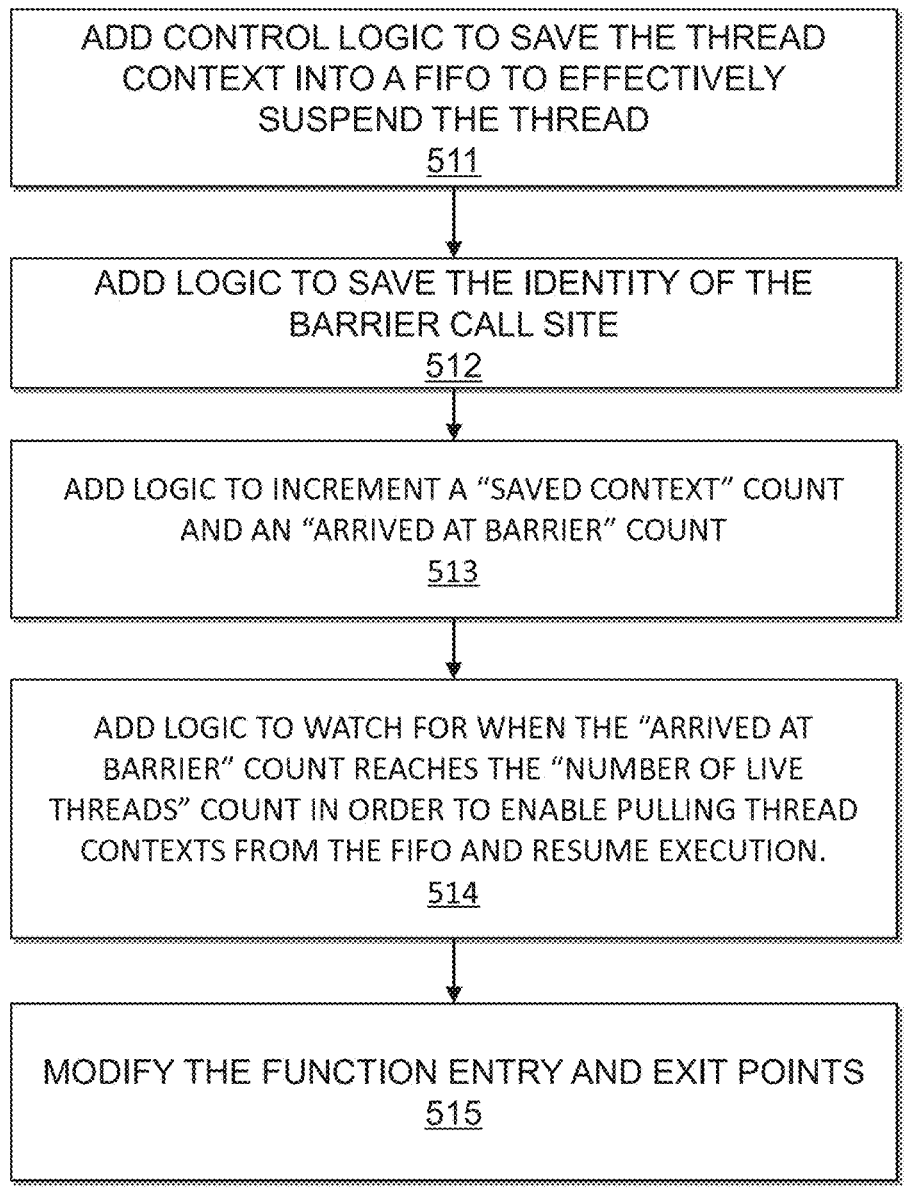
FIG. 5 is a flow chart illustrating barrier synchronization transformation according to an embodiment of the present invention.

FIG. 5 is a flow chart diagram illustrating a method for performing barrier synchronization according to an embodiment of the present invention. The procedure in FIG. 5 may be utilized to perform aspects of 404 and 405 illustrated in FIG. 4 focusing particularly on replacing the barrier function with control logic. In both translations (i.e., for single-threaded and concurrent target), the idea is to capture the fact that barrier calls are really a change in control flow. Thus, each barrier call is replaced with the following control logics, which will be described in more detail below. At 511, control logic is added to save the thread context into a FIFO to effectively suspend the thread.

At 512, control logic is added to save the ID of the barrier call site. According to an embodiment of the present invention, this stores the control information.

At 513, control logic to increment a "saved context" count and an "arrived at barrier" count is added. According to an embodiment of the present invention this is a synchronization coordination process. The "arrived at barrier" count indicates the number of threads that have arrived.

At 514, logic to watch for when the "arrived at barrier" count reaches the "number of live threads" count is added. When this occurs, logic that pulls thread contexts from the FIFO is enabled. This is implemented in order to detect whether every thread has arrived at the barrier.

At 515, bookkeeping function is performed. At this point, the kernel function entry and exit points are modified by adding code to the kernel entry to initialize the FIFO with a fresh context for each work item. In addition, code is added to each return from the kernel, and to decrement the live thread count.

Figure 6:
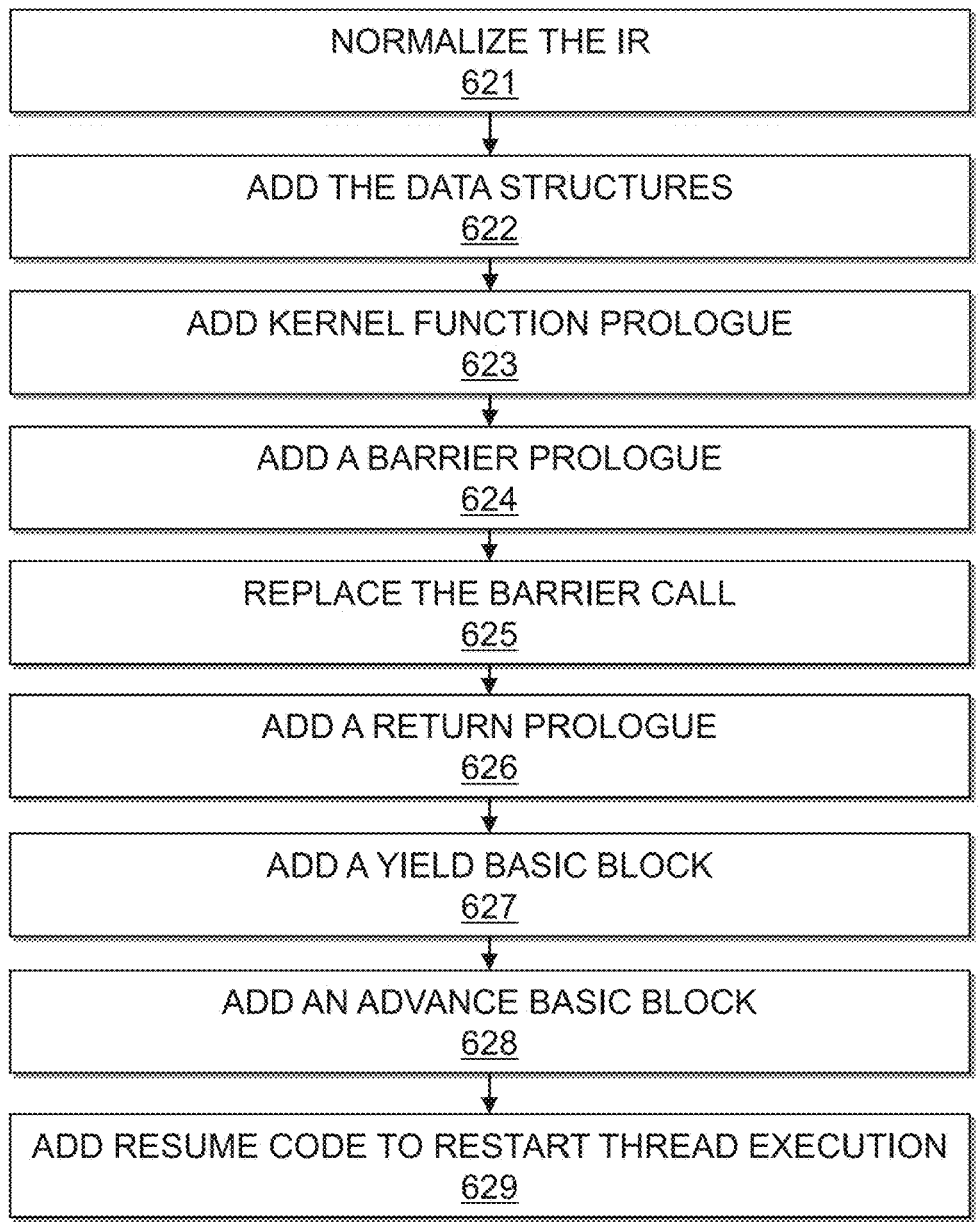
FIG. 6 is a flow chart illustrating barrier synchronization transformation for a single threaded target according to an embodiment of the present invention.

FIG. 6 illustrates a method for performing barrier synchronization transformation for single-threaded target hardware devices. At 621, the intermediate representation (IR) (i.e., the optimized compiler intermediate representation from the optimizer 211 of FIGS. 2-3) is normalized. The normalization includes transforming code into a standard IR in SSA (Static Single Assignment) form, inlining function calls until all barrier calls occur directly in the kernel body, rather than being buried behind function calls, and assigning a unique integer index to each barrier call site, and to the kernel entry point. This integer serves as the barrier ID. Here, the code is also translated into concurrent objects.

At 622, data structures are added. According to an embodiment of the present invention, these data structures may include (1) num_live_threads, (2) leaving_barrier, (3) arriving_barrier, (4) numthreads_at_arrival_barrier, (5) context[ ], and (6) num_contexts.

The num_live_threads data structure indicate the number of (original) threads that remain live (i.e., have not yet exited the parallel code). At the beginning of the work group execution, this is initialized to the work group size.

The leaving_barrier data structure indicates the ID of the most recently visited rendezvous point (barrier or kernel entry).

The arrival_barrier data structure indicates the ID of the barrier call site reached by at least one of the live threads, but not all of them.

The num_threads_at_arrival_barrier data structure indicates the number of (original) threads whose execution has reached a rendezvous point, but which are waiting for still more live threads to arrive (all waiting threads are live, by definition).

The context[ ] data structure indicates a FIFO module or buffer used to store thread contexts for threads that have reached a rendezvous point. A thread context is defined as the set of live program values at the barrier call site or at kernel entry. The set of live values will be different at each barrier call site. The FIFO must be large enough to accommodate the worse case, which is the work group size times the worst case (largest) set of live values at a barrier.

The num-contexts data structure indicates the number of thread contexts stored in the context FIFO. An explicit counter is used rather than just the FIFO fill level because the size of each thread context varies by barrier call site.

According to an embodiment of the present invention, the context FIFO plays an important role in barrier synchronization transformation. The context FIFO stores thread contexts and associated bookkeeping. During program execution, there are two types of thread contexts stored in the context FIFO. The newest types of thread contexts are the live values for threads suspended at the "arriving" barrier, and there are num_threads_at_arrival_barrier of them. The oldest types of thread contexts are the live values for threads suspended at the "leaving" rendezvous point, and there are (num_contexts−num_threads_at_arrival_barrier) of them. As threads arrive at the "arrival" barrier, the FIFO is filled with contexts, and are counted via num_contexts. Once all the live threads arrived at the "arrival" barrier, it can be declared that resuming the threads from the "leaving" barrier is finished. At this time, the interpretation of the data stored in the FIFO must be flipped. This can be done by resetting num_threads_at_arrival_barrier to zero and updating the leaving_barrier ID. It will always be the case that the num_live_threads data structure is greater than or equal to num_contexts, which is greater than or equal to num_threads_at_arrival_barrier, which is greater than or equal to zero. The num_live_threads is at most the size of the work group.

At 623, the kernel prologue is added. According to an embodiment of the present invention, at the kernel entry point, instructions to emulate the arrival of all the threads in the work group are added. Instructions are added to push each work item's thread context into the context FIFO (at kernel entry, the thread context is just the work item ID, plus the live kernel parameters). Also, the num_live_threads, num_contexts, and num_threads_at_arrival_barrier data structures are set to the number of items in the work group. The arrival_barrier data structure is also set at zero. Finally, a branch to a new yield basic block is inserted.

At 624, a barrier prologue is added. According to an embodiment of the present invention, before each barrier call site, instructions to set arrival_barrier to that barrier's ID are added and the thread context (i.e., set of live values) is inserted into the context FIFO. Moreover, both num_contexts and num_threads_at_arrival_barrier data structures are incremented.

At 625, the barrier call is replaced. According to an embodiment of the present invention, the barrier call is replaced with an unconditional branch to the yield basic block. The instruction after the barrier call becomes the beginning of a new basic block (that is, the old basic block was split into two). The second block will later be referred to as post-barrier block for the ID of this barrier site.

At 626, a return prologue is added. Each kernel function return represents the end of the thread associated with a work item. Before each return, instructions need to be added to decrement num_live_threads by one. Then a conditional branch based on the value of num_live_threads is added. If it is positive, then control is transferred to the yield block. Otherwise, it is zero and control is transferred to a new basic block which just returns from the kernel function.

At 627, a yield basic block is added. According to an embodiment of the present invention, this may include a conditional branch based on whether the num_threads_at_arrival_barrier data structure or count is equal to the num_live_threads. The true case branches to the advance block, and the false case branches to the resume code.

At 628, an advance basic block is added. According to an embodiment of the present invention, the advance basic block sets num_threads_at_arrival_barrier to zero. It also sets leaving_barrier to the current value of arrival_barrier, and transfers control to the resume code. These variable updates recognize the fact that program execution has fully let the "leaving" rendezvous point and reached the next rendezvous point, namely the "arriving" barrier.

At 629, resume code is added to restart thread execution. According to an embodiment of the present invention, the resume code decrements num_contexts by one, pulls a thread context from the context FIFO, and then transfers control to one of the post-barrier blocks. These procedures (context restore and multi-way branch) depend on the value of leaving_barrier (i.e., on the identity of the original barrier call site and hence the program location at which the contexts had been saved). In particular, the barrier call site determines the thread context size and which program values should receive the restored values. The multi-way branch switches based on the leaving_barrier.

Figure 7A:
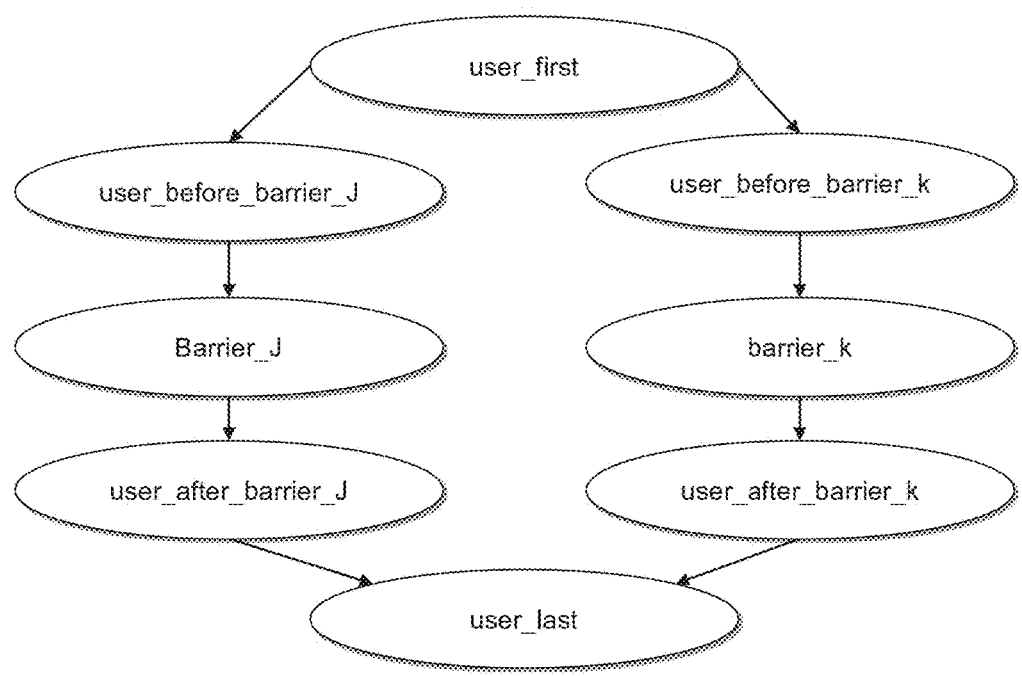
FIG. 7A illustrates an example kernel function control flow before transformation according to an embodiment of the present invention.
Figure 7B:
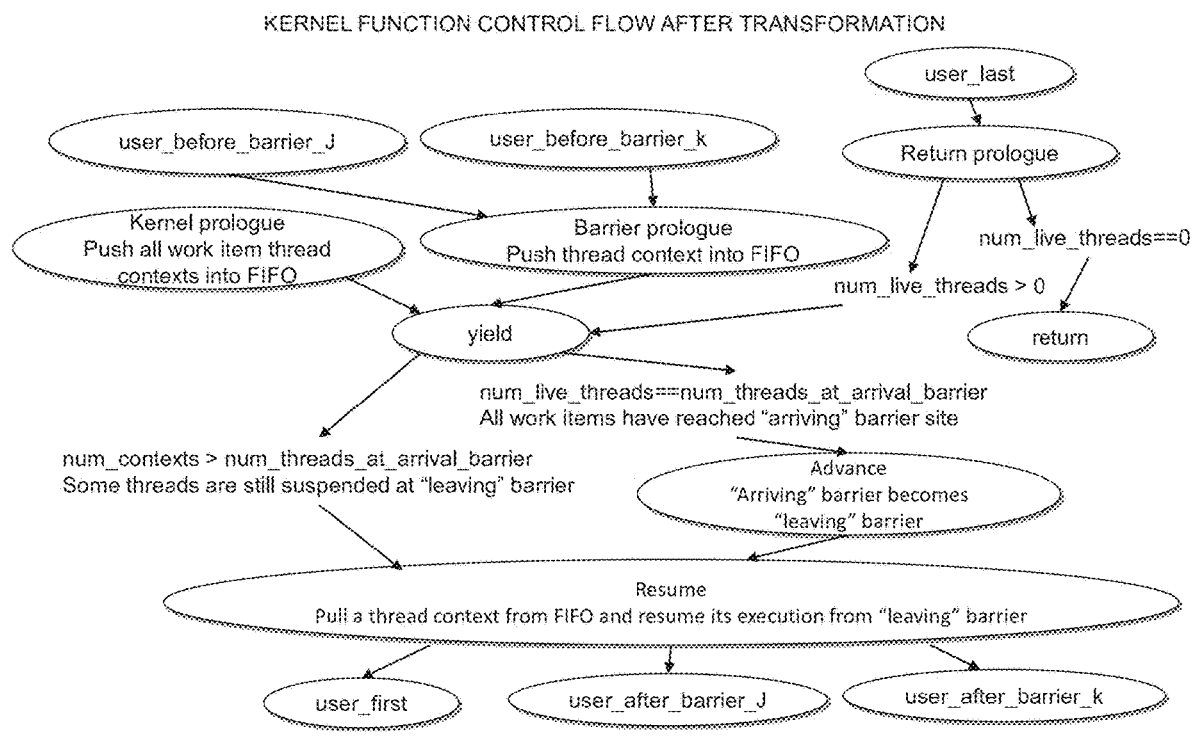
FIG. 7B illustrates an example kernel function control flow after transformation according to an embodiment of the present invention.

FIG. 7A illustrates an example kernel function control flow before transformation and FIG. 7B illustrates the kernel function control flow after transformation to a single-threaded target device by the barrier synchronization logic generator of FIGS. 2-3 in executing the transformation process of FIGS. 4-6. As illustrated in FIG. 7A, the control flow of a parallel kernel function in an example user program (i.e., program 101 of FIG. 1) is shown that begins with the user_first block of code. Eventually, that code reaches one of two barrier calls (i.e., barrier_j and barrier_k). Here the code immediately before and immediately after the barrier calls are shown along the j and k paths as user_before_barrier_j, user_before_barrier_k, user_after_barrier_j, user_after_barrier_k, respectively. Finally, the kernel function shown in FIG. 7A ends with a return just after the user_last block of code. FIG. 7B showed the transformed code, with all the sections of code added by the transformation, and the way control is transferred between the pre-existing user code and the new code.

As illustrated in FIGS. 7A and 7B, control is transferred to the yield block when a work item thread has been suspended (i.e., the thread context has been saved into the context FIFO). The job of the yield block is to determine what to do next. It must decide which work item context to restore and where to transfer control to resume that thread's execution. It comes down to whether all the work item threads have left the "leaving" rendezvous point and arrived at the "arriving" barrier. There are still threads at the old "leaving" barrier if and only if num_threads_at_arrival_barrier is less than num_contexts. The alternative case is when num_threads_at_arrival_barrier is equal to num_contexts which means that all the threads have finally reached the "arriving" barrier. That is when execution of the threads at that new barrier should be resumed.

The context data structure is defined above as a FIFO, but it does not have to be strictly FIFO. The strict ordering can be relaxed, as long as the extraction process differentiates between the contexts from the "leaving" barrier and the contexts from the "arriving" barrier. Also, the context data structure support inserting and extracting variable sized information. Alternatively, the extraction process may filter out the unnecessary data.

Figure 8:
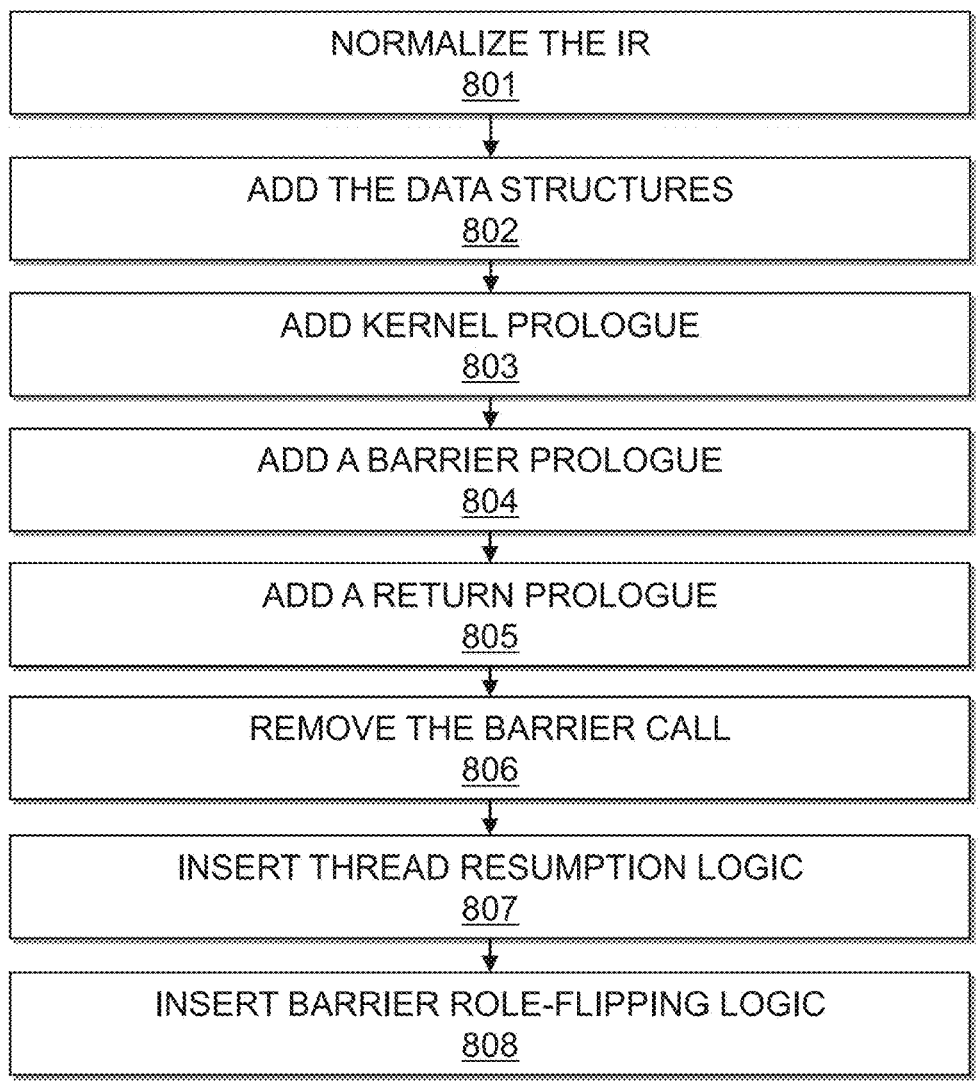
FIG. 8 is a flow chart illustrating barrier synchronization transformation for concurrent target hardware devices according to an embodiment of the present invention.

FIG. 8 is a flow chart illustrating barrier synchronization transformation for concurrent target hardware devices according to an embodiment of the present invention. At 801, the IR (i.e., the optimized compiler intermediate representation from the optimizer 211 of FIGS. 2-3) is normalized. As described above, this normalization includes transforming code into a standard IR in SSA form, inlining function calls until all barrier calls occur directly in the kernel body, rather than being buried behind function calls, and assigning a unique integer index to each barrier call site, and to the kernel entry point. This integer serves as the barrier ID. Here, the code is also translated into concurrent objects.

At 802, the data structures are added. According to an embodiment of the present invention, the data structures include counters, state variables, and context FIFO (same as those for single-threaded target execution).

At 803, a kernel prologue is added. According to an embodiment of the present invention, at this point, the hardware that is activated at kernel startup also inserts each work item's thread context into the context FIFO. Also, variables num_live_threads, num_contexts and num_threads_at_arrival_barrier are set to the number of threads in the work group, and arrival_barrier is set to zero.

At 804, a barrier prologue is added. According to an embodiment of the present invention, where a barrier function call statement would be activated by an activation token, a block (activated by the same signal) is inserted to push the thread context into the FIFO, to increment both num_threads_at_arrival_barrier and num_contexts by one, and to set arrival_barrier to the barrier's ID.

At 805, a return prologue is added. According to an embodiment of the present invention, where a function return is activated, a hardware block (activated by the same signal) to decrement num_live_threads by one is inserted.

At 806, the barrier call is removed. According to an embodiment of the present invention, any hardware representation of the barrier call is removed. However, for each of the barrier calls, remember what hardware was activated by the completion of the barrier call. Such downstream blocks are referred to as "post-barrier" hardware, and are remembered by barrier ID.

At 807, thread resumption logic is inserted. According to an embodiment of the present invention, hardware to watch the value of num_contexts—num_threads_at_arrival_barrier is inserted. When the value is greater than zero, the block should decrement num_contexts and pull a thread context from the context FIFO and propagate those values and a corresponding activation signal to the post-barrier hardware corresponding to the barrier IP stored in leaving_barrier.

At 808, barrier role-flipping logic is inserted. According to an embodiment of the present invention, hardware to watch the values num_threads_at_arrival_barrier and num_live_threads is inserted. When the values are equal, num_threads_atarrival_barrier is reset to zero and leaving_barrier is set to the value of arrival_barrier. This indicates that all the live threads have reached the "arriving" barrier, and so that barrier switches roles to become the "leaving" barrier. On the next synchronous update cycle, the thread resumption logic will be enabled, thus re-injecting the data and activation tokens for the suspended threads. Note that all the state updates occur simultaneously, but synchronously.

Figure 9A:
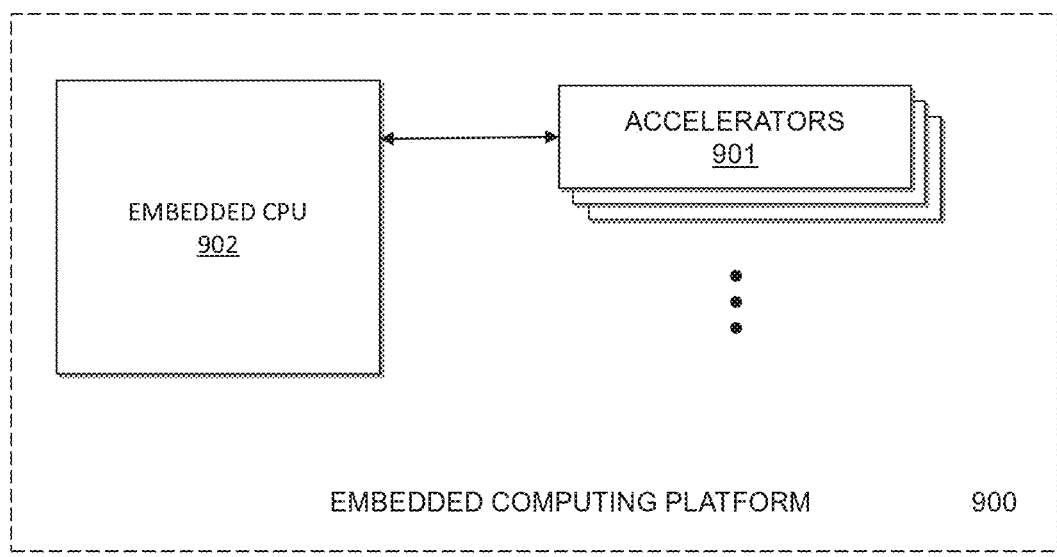
FIG. 9A is a block diagram illustrating an exemplary implementation of a programmable logic system programmed to have an embedded CPU and a number of accelerators to form an embedded computing platform according to an embodiment of the present invention.

FIG. 9A is a block diagram illustrating a first exemplary implementation of a programmable logic system according to an embodiment of the present invention. As shown in FIG. 9A, an embedded computing platform 900 includes an embedded CPU 902 and a number of accelerators 901. Each of the accelerators 901 is a programmed processor and memory combination. The embedded CPU 902 communicates with the accelerators 901. The embedded computing platform 900 may be implemented by the programmable logic system 113 of FIG. 1.

Figure 9B:
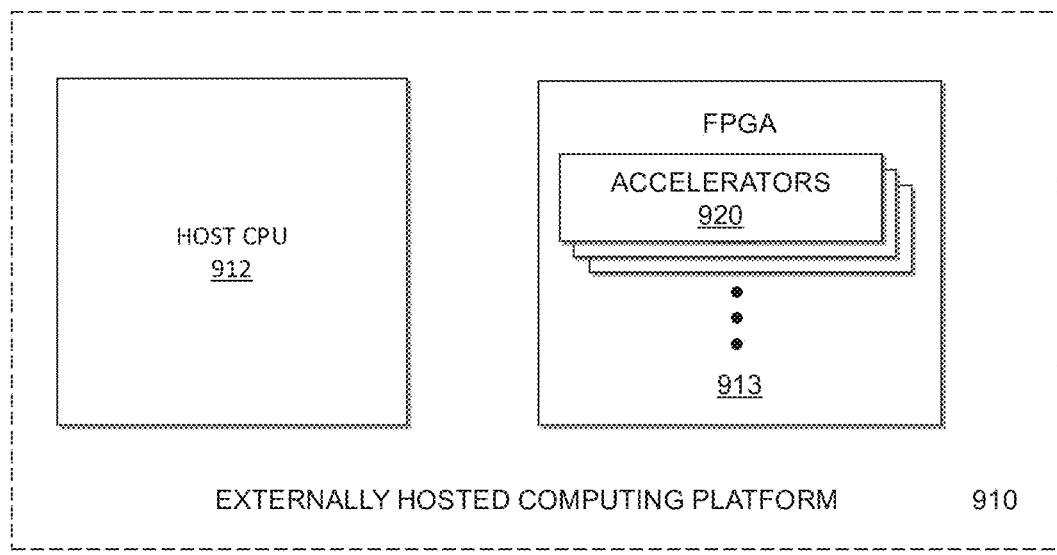
FIG. 9B is a block diagram illustrating an exemplary implementation of a programmable logic system that includes a number of accelerators that communicate with an external host CPU to form an externally hosted computing platform according to an embodiment of the present invention.

FIG. 9B is a block diagram illustrating a second exemplary implementation of a programmable logic system according to an embodiment of the present invention. As shown from FIG. 9B, an externally hosted computing platform 910 includes a host CPU 912 and a FPGA 913 that includes a number of accelerators 920 programmed on it. Each of the accelerators 920 is a processor/memory combination. The accelerators 920 communicate with the external host CPU 912 to form the externally hosted computing platform 910. The FPGA 913 can be implemented by the programmable logic system 113 of FIG. 1.

Figure 10:
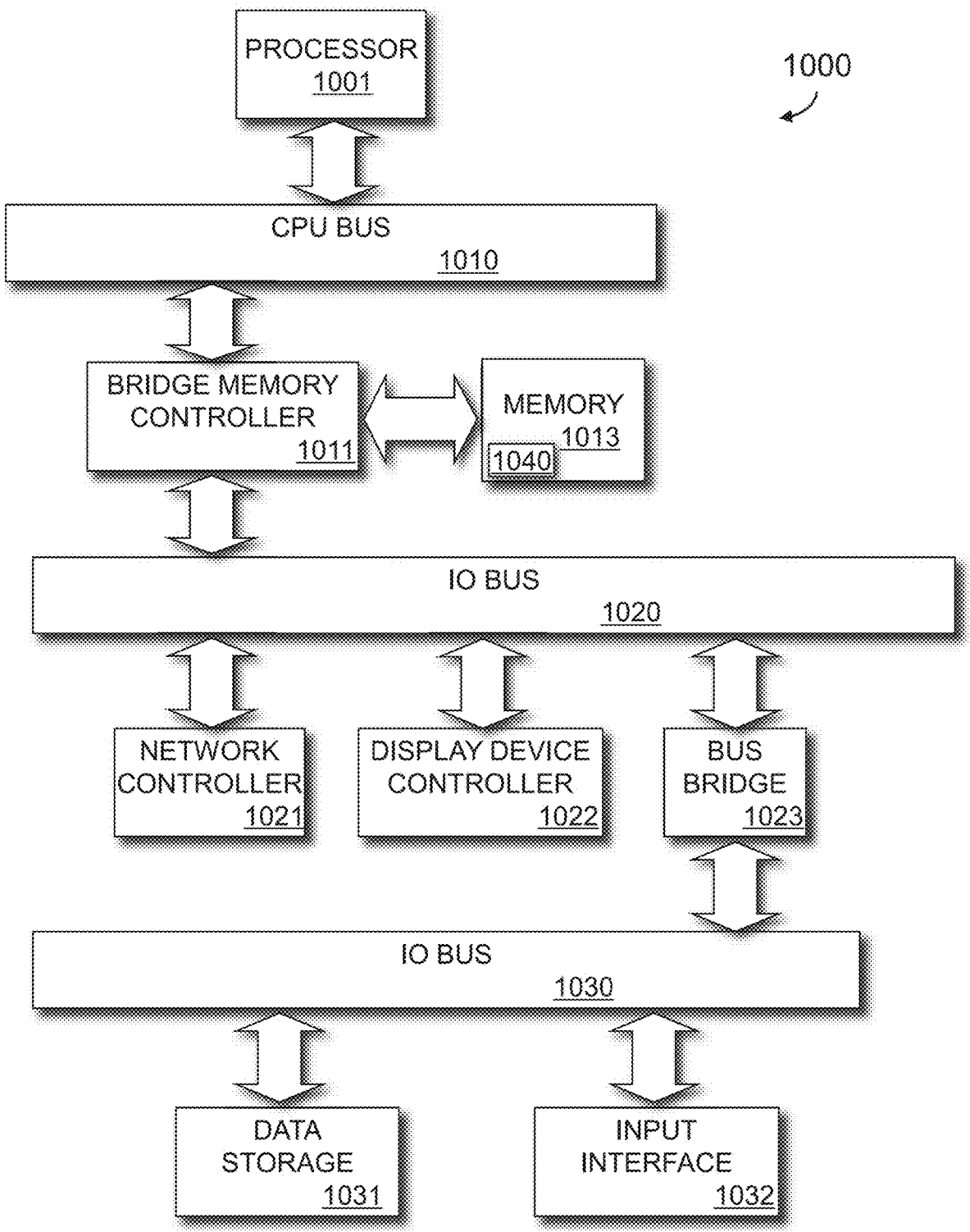
FIG. 10 is an exemplary computer system that executes software program code to implement the OpenCL compiler and runtime environment that includes a barrier synchronization logic generator according to an embodiment of the present invention.

FIG. 10 is a block diagram of an exemplary computer system 1000 in which an example embodiment of the present invention resides. The computer system 1000, along with corresponding software program code stored in memory 1013 as 1040 may be used to implement the kernel compiler and runtime environment 200/300 and the barrier synchronization logic generator 220/320 illustrated in FIGS. 2 and 3. The computer system 1100 includes a processor 1001 that processes data signals. The processor 1001 is coupled to a CPU bus 1010 that transmits data signals between other components in the computer system 1000.

The computer system 1000 includes a memory 1013. The memory 1013 may be a dynamic random access memory, a static random access memory, and/or other memory. The memory 1013 may store instructions and code represented by data signals that may be executed by the processor 1001. A bridge memory controller 1011 is coupled to the CPU bus 1010 and the memory 1013. The bridge memory controller 1011 directs data signals between the processor 1001, the memory 1013, and other components in the computer system 1000 and bridges the data signals between the CPU bus 1010, the memory 1013, and a first IO bus 1020.

The first IO bus 1020 may be a single bus or a combination of multiple buses. The first IO bus 1020 provides communication links between components in the computer system 1000. A network controller 1021 is coupled to the first IO bus 1020. The network controller 1021 may link the computer system 1000 to a network of computers (not shown) and supports communication among the machines. A display device controller 1022 is coupled to the first IO bus 1020. The display device controller 1022 allows coupling of a display device (not shown) to the computer system 1000 and acts as an interface between the display device and the computer system 1000. A second IO bus 1030 may be a single bus or a combination of multiple buses. The second IO bus 1030 provides communication links between components in the computer system 1000. A data storage device 1031 is coupled to the second IO bus 1030. The data storage device 1031 may be a hard disk drive, a floppy disk drive, a CD-ROM device, a flash memory device or other mass storage device. An input interface 1032 is coupled to the second IO bus 1030. The input interface 1032 may be, for example, a keyboard and/or mouse controller or other input interface. The input interface 1032 may be a dedicated device or can reside in another device such as a bus controller or other controller. The input interface 1032 allows coupling of an input device to the computer system 1000 and transmits data signals from an input device to the computer system 1000. A bus bridge 1023 couples the first IO bus 1020 to the second IO bus 1030. The bus bridge 1023 operates to buffer and bridge data signals between the first IO bus 1020 and the second IO bus 1030. It should be appreciated that computer systems having a different architecture may also be used to implement the computer system 1000.

Embodiments of the present invention may be provided as a computer program product, or software, that may include an article of manufacture on a machine accessible or machine readable medium having instructions. The instructions on the machine accessible or machine readable medium may be used to program a computer system or other electronic device. The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium" or "machine readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

FIGS. 4-6, and 8 are flow charts illustrating embodiments of the present invention. Some of the techniques illustrated in these figures may be performed sequentially, in parallel or in an order other than that which is described. It should be appreciated that not all of the techniques described are required to be performed, that additional techniques may be added, and that some of the illustrated techniques may be substituted with other techniques.

In the foregoing specification, embodiments of the invention have been described with reference to specific exemplary embodiments thereof. It will, however, be evident that various modifications and changes may be made thereto without departing from the broader spirit and scope of the embodiments of the invention. The specification and drawings are, accordingly, to be regarded in an illustrative rather than restrictive sense.

What is claimed is:

1. A method of compiling a first program code, the method comprising:
   determining if the first program code is to program a programmable logic device to execute a second program code, wherein the first program code is a parallel program having a barrier function call for a group of threads; and
   transforming the first program code by replacing the barrier function call with additional hardware control logic specified to be programmed into the programmable logic device to form a transformed program in response to determining that the first program code is to program the programmable logic device, wherein the transformed program code remains a parallel program and maintains synchronization among the group of threads.

2. The method of claim 1 further comprising determining whether the programmable logic device supports one of a single-threaded code execution and a concurrent code execution prior to transforming the first program code.

3. The method of claim 2, wherein the additional hardware control logic also specifies data structures and instructions to be added and modification to be made to a control flow of the single threaded code execution in response to determining that the programmable logic device supports the single-threaded code execution.

4. The method of claim 2, wherein the additional hardware control logic also specifies data structures and instructions to be added and modification to be made to a control flow of the single threaded code execution in response to determining that the programmable logic device supports the single-threaded code execution, wherein transforming the first program code further comprises:
   adding data structures;
   adding kernel function prologue;
   adding a barrier prologue;
   removing the barrier function call;
   adding a return prologue;
   adding a yield basic block;
   adding an advance basic block; and
   adding resume code to restart thread execution.

5. The method of claim 2, wherein the additional hardware control logic also specifies modification to be made to programming of the programmable logic device in response to determining that the programmable logic device supports the concurrent code execution.

6. The method of claim 2, wherein the additional hardware control logic also specifies modification to be made to programming of the programmable logic device by specifying data structures to be instantiated, updates to the data in response to signals and data from other modules, and what update signals and values for use by other parts of the transformed program code are to be generated.

7. The method of claim 6, wherein transforming the first program code by replacing the barrier function call with the additional hardware control logic further comprises:
   adding the data structures;
   adding kernel function prologue;
   adding a barrier prologue;
   adding a return prologue;
   removing the barrier function call;
   inserting thread resumption logic; and
   inserting barrier role-flipping logic.

8. The method of claim 1, wherein transforming the first program code by replacing the barrier function call with the additional hardware control logic further comprises:
   adding logic to save thread contexts of threads being executed that have reached the barrier function call into a first-in-first-out module to effectively suspends execution of the threads;
   adding logic to save identity of the barrier function call;
   adding logic to increment a first count that indicates a number of threads with their thread contexts saved and a second count that indicates a number of threads reaching the barrier function call;
   adding logic to determine when the second count equals a third count representing a number of live threads; and adding logic to fetch all the thread contexts stored in the first-in-first-out module in a first-in-first-out order and resume their execution when the second count equals the third count.

9. The method of claim 1, wherein the programmable logic device is a field programmable gate array.

10. The method of claim 1, wherein transforming the first program code by replacing the barrier function call with the additional hardware control logic further comprises:
adding logic to save thread contexts of threads being executed that have reached the barrier function call into a first-in-first-out module to effectively suspends execution of the threads; and
adding logic to fetch all the thread contexts stored in the first-in-first-out module in a first-in-first-out order and resume their execution.

11. The method of claim 1, wherein replacing the barrier function call with the additional hardware control logic is performed by:
adding a counter and a first-in-first-out (FIFO) module to force wait and suspension during thread execution if the programmable logic device is determined to support a single-threaded code execution; and
adding a counter and a buffer to force stop, wait, and switch between threads during thread execution if the programmable logic device is determined to support concurrent code execution.

12. A compiler system, comprising:
a processor having:
compiler modules that compile a parallel first program code with a barrier function call for a group of threads, wherein the first program code is to program a programmable logic device to execute a second program code; and
barrier synchronization logic generator within the compiler modules to replace the barrier function call with additional hardware control logic specified to be programmed into the programmable logic device to form a transformed program when the compiler modules determine that the first program code is to programs the programmable logic device to execute the second program code, wherein the transformed program code remains a parallel program and maintains synchronization among the group of threads.

13. The compiler system of claim 12, wherein the barrier synchronization logic generator receives system description information of the programmable logic device that describes whether the programmable logic device supports one of a single-threaded code execution and a concurrent code execution prior to inserting description of the additional hardware control logic specified to be programmed into the programmable logic device into the first program code.

14. The compiler system of claim 13, wherein if the programmable logic device supports the single-threaded code execution, the barrier synchronization logic generator inserts the additional hardware control logic by:
adding data structures;
adding kernel function prologue;
adding a barrier prologue;
removing the barrier function call;
adding a return prologue;
adding a yield basic block;
adding an advance basic block; and
adding resume code to restart thread execution.

15. The compiler system of claim 13, wherein if the programmable logic device supports the concurrent code execution, the barrier synchronization logic generator inserts the additional hardware control logic by:
adding data structures;
adding kernel function prologue;
adding a barrier prologue;
adding a return prologue;
removing the barrier function call;
inserting thread resumption logic; and
inserting barrier role-flipping logic.

16. The compiler system of claim 12, wherein the additional hardware control logic further comprises:
first-in-first-out module;
logic to save thread contexts of threads being executed that have reached the barrier function call into the first-in-first-out module to effectively suspends execution of the threads;
logic to save identity of the barrier function call;
logic to increment a first count that indicates a number of threads with their thread contexts saved and a second count that indicates a number of threads reaching the barrier function call;
logic to determine when the second count equals a third count representing a number of live threads;
logic to fetch all the thread contexts stored in the first-in-first-out module in a first-in-first-out order and resume their execution when the second count equals the third count.

17. The compiler system of claim 12, wherein the programmable logic device is a field programmable gate array.

18. The compiler system of claim 12, wherein the additional hardware control logic further comprises:
first-in-first-out module;
logic to save thread contexts of threads being executed that have reached the barrier function call into the first-in-first-out module to effectively suspends execution of the threads; and
logic to fetch all the thread contexts stored in the first-in-first-out module in a first-in-first-out order and resume their execution.

19. The compiler system of claim 12, wherein the additional hardware control logic further comprises:
a counter and a first-in-first-out (FIFO) module to force wait and suspension during thread execution if the programmable logic device is determined to support a single-threaded code execution;
a counter and a buffer to force stop, wait, and switch between threads during thread execution if the programmable logic device is determined to support concurrent code execution.

20. A non-transitory computer readable medium including a sequence of instructions stored thereon for causing a computer to execute a method of compiling a first program code comprising:
determining if the first program code is to program a programmable logic device to execute a second program code, wherein the first program code is a parallel program having a barrier function call for a group of threads;
transforming the first program code by replacing the barrier function call with additional hardware control logic specified to be programmed into the programmable logic device to form a transformed program in response to determining that the first program code is to programs the programmable logic device, wherein the transformed program code remains a parallel program and maintains synchronization among the group of threads.

21. The non-transitory computer readable medium of claim 20, further comprising instructions to determine whether the programmable logic device supports one of a single-threaded code execution and a concurrent code execution prior to transforming the first program code.

22. The non-transitory computer readable medium of claim 21, wherein if it is determined that the programmable logic device supports the single-threaded code execution, then the transforming the first program code further comprises:
adding data structures;
adding kernel function prologue;
adding a barrier prologue;
removing the barrier function call;
adding a return prologue;
adding a yield basic block;
adding an advance basic block; and
adding resume code to restart thread execution.

23. The non-transitory computer readable medium of claim 21, wherein if it is determined that the programmable logic device supports the concurrent code execution, then the transforming the first program code further comprises:
adding the data structures;
adding kernel function prologue;
adding a barrier prologue;
adding a return prologue;
removing the barrier function call;
inserting thread resumption logic; and
inserting barrier role-flipping logic.

24. The non-transitory computer readable medium of claim 20, wherein transforming the first program code by replacing the barrier function call with additional hardware control logic further comprises:
adding a first-in-first-out module;
adding logic to save thread contexts of threads being executed that have reached the barrier call into the first-in-first-out module to effectively suspends execution of the threads;
adding logic to save identity of the barrier function call;
adding logic to increment a first count that indicates a number of threads with their thread contexts saved and a second count that indicates a number of threads reaching the barrier function call;
adding logic to determine when the second count equals a third count representing a number of live threads; and
adding logic to fetch all the thread contexts stored in the first-in-first-out module in a first-in-first-out order and resume their execution when the second count equals the third count.

25. The non-transitory computer readable medium of claim 20, wherein the programmable logic device is a field programmable gate array.

26. The non-transitory computer readable medium of claim 20,
wherein transforming the first program code by replacing the barrier function call with the additional hardware control logic further comprises:
adding logic to save thread contexts of threads being executed that have reached the barrier function call into a first-in-first-out module to effectively suspends execution of the threads; and
adding logic to fetch all the thread contexts stored in the first-in-first-out module in a first-in-first-out order and resume their execution.

27. The non-transitory computer readable medium of claim 20, wherein replacing the barrier function call with the additional hardware control logic is performed by:
adding a counter and a first-in-first-out (FIFO) module to force wait and suspension during thread execution if the programmable logic device is determined to support a single-threaded code execution; and
adding a counter and buffer to force stop, wait, and switch between threads during thread execution if the programmable logic device is determined to support concurrent code execution.

* * * * *